(12) United States Patent
Stamey, Jr. et al.

(10) Patent No.: US 8,127,934 B2
(45) Date of Patent: *Mar. 6, 2012

(54) FLUID FILTER ELEMENT

(75) Inventors: Willie L. Stamey, Jr., Kings Mountain, NC (US); Mark A. Roll, Bessemer City, NC (US)

(73) Assignee: Wix Filtration Corp LLC, Gastonia, NC (US)

( * ) Notice: Subject to any disclaimer, the term of this patent is extended or adjusted under 35 U.S.C. 154(b) by 206 days.

This patent is subject to a terminal disclaimer.

(21) Appl. No.: 12/435,102

(22) Filed: May 4, 2009

(65) Prior Publication Data

US 2010/0140151 A1  Jun. 10, 2010

Related U.S. Application Data

(63) Continuation of application No. 11/046,861, filed on Feb. 1, 2005, now Pat. No. 7,543,711.

(51) Int. Cl.
| | |
|---|---|
| *B01D 25/00* | (2006.01) |
| *B01D 27/00* | (2006.01) |
| *B01D 35/30* | (2006.01) |
| B01D 27/10 | (2006.01) |
| B01D 35/14 | (2006.01) |

(52) U.S. Cl. ........ 210/437; 210/430; 210/438; 210/457; 210/130; 210/444; 210/232; 210/234; 210/435

(58) Field of Classification Search .................. None
See application file for complete search history.

(56) References Cited

U.S. PATENT DOCUMENTS

| 5,413,712 | A | * | 5/1995 | Gewiss et al. | 210/450 |
| 5,770,054 | A | * | 6/1998 | Ardes | 210/130 |
| 5,846,417 | A | * | 12/1998 | Jiang et al. | 210/235 |
| 7,543,711 | B1 | * | 6/2009 | Stamey et al. | 210/435 |
| 2001/0004061 | A1 | * | 6/2001 | Popoff et al. | 210/235 |
| 2003/0132158 | A1 | * | 7/2003 | Clausen et al. | 210/450 |

* cited by examiner

*Primary Examiner* — Nam Nguyen
*Assistant Examiner* — Madeline Gonzalez
(74) *Attorney, Agent, or Firm* — Honigman Miller Schwartz and Cohn LLP

(57) ABSTRACT

A filter element is removably positionable within a filter housing defining a filter chamber for said filter element. The filter housing comprises a standpipe extending within the filter chamber. The filter element includes a tubular filter media circumscribing the standpipe, a first end cap supporting the filter media at one end thereof, a second end cap longitudinally spaced from the first end cap and supporting the filter media at the opposite end thereof, and a center tube extending between the first and second end caps. The center tube has at least one inlet opening therethrough, a bypass opening at a first end thereof adjacent to the first end cap and a standpipe opening at a second end thereof adjacent to the second end cap and through which the standpipe is adapted to be inserted longitudinally into the center tube.

24 Claims, 10 Drawing Sheets

FLUID FILTER ELEMENT

RELATED APPLICATION

This application is a continuation of U.S. patent application Ser. No. 11/046,841 filed on Feb. 1, 2005, the contents of which are fully incorporated herein by reference.

BACKGROUND OF THE INVENTION

1. Field of the Invention

This invention relates to fluid filter assemblies in general, and, more particularly, to a replaceable filter element of the fluid filter assembly.

2. Description of the Prior Art

Many types of fluid filter assemblies are known in the prior art. A popular type of filter assembly is one that has a housing which encloses a replaceable filter element. A filter media of the filter element captures many of the impurities that are removed from the fluid, such as liquid. Periodically the filter element must be replaced. Such periodic replacement ensures that the filter element will not become so loaded with impurities that fluid flow is restricted. Replacing the element also ensures that impurities are removed from fluid before it is delivered to other fluid system components such as fluid injection pumps, fluid injectors, oil pump, or engine parts where such contaminants may cause severe damage.

Changing filter elements may pose problems however. One common problem is that disturbance of the spent element during replacement may cause collected impurities to fall off the element. In some designs, these impurities may travel into the outlet of the filter housing. As a result these contaminants may reach the components downstream in the fluid system. Another problem with certain prior art fluid filter constructions is that changing the element may require a mechanic to have skin contact-with the fluid. It is desirable to minimize such contact when changing a filter element.

While known liquid filters have proven to be acceptable for various vehicular applications, such devices are nevertheless susceptible to improvements that may enhance their performance and cost. With this in mind, a need exists to develop improved fluid filter element that advances the art.

SUMMARY OF THE INVENTION

The present invention provides a new and improved filter element for a fluid filter assembly. The fluid filter assembly in accordance with the present invention comprises a filter housing having a central axis and defining a filter chamber, a standpipe extending upwardly substantially coaxially to the central axis of the filter housing into the filter chamber so as to define an internal flow passage, and a filter element removably positionable within the filter chamber of the filter housing. The filter element of the present invention comprises a tubular filter media circumscribing the central axis, a first end cap supporting the filter media at one end thereof, a second end cap longitudinally spaced from the first end cap and supporting the filter media at the opposite end thereof, and a center tube extending between the first and second end caps.

The center tube has a substantially cylindrical side surface extending between opposite first and second ends thereof. The center tube is further provided with at least one inlet opening, a bypass opening at a first end thereof adjacent to the first end cap, and a standpipe opening at a second end thereof adjacent to the second end cap and through which the standpipe is adapted to be inserted longitudinally into the center tube.

Upon further study of the specification and appended claims, further features and advantages of this invention will become apparent to those skilled in the art.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings. For purposes of the following description, the terms "upper", "lower", "top", "bottom", "upward", "downward", "vertical", "horizontal" and derivatives of such terms shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts. Specific dimensions and other physical characteristics relating to the embodiments disclosed herein are not to be considered as limiting, unless expressly stated otherwise.

Figure 1:
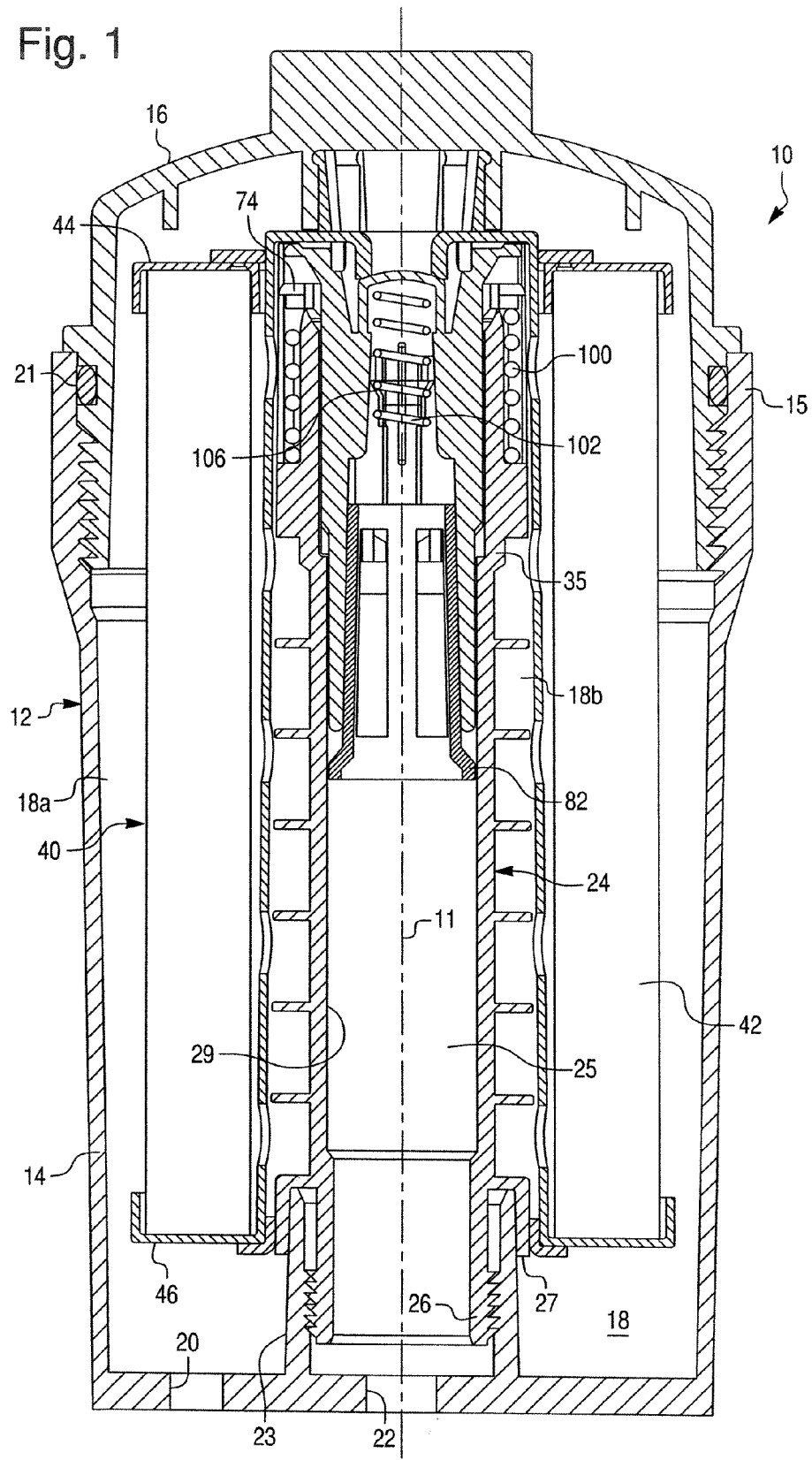
FIG. 1 is a cross-sectional view of a fluid filter assembly in accordance with the preferred embodiment of the present invention.

FIG. 1 depicts a fluid filter assembly 10 in accordance with the preferred embodiment of the present invention providing an outside-in flow pattern. The fluid filter assembly 10 comprises a filter housing 12 and a replaceable (or disposable)

filter element 40 removably mounted within the filter housing 12, the combination of which provides the filter assembly 10. Preferably, the filter assembly 10 is provided for filtering particulate impurities from liquid fluids such as oil, gasoline or diesel. It will be appreciated that the filter assembly 10 of the present invention may be used for filtering any appropriate fluid.

Figure 2:
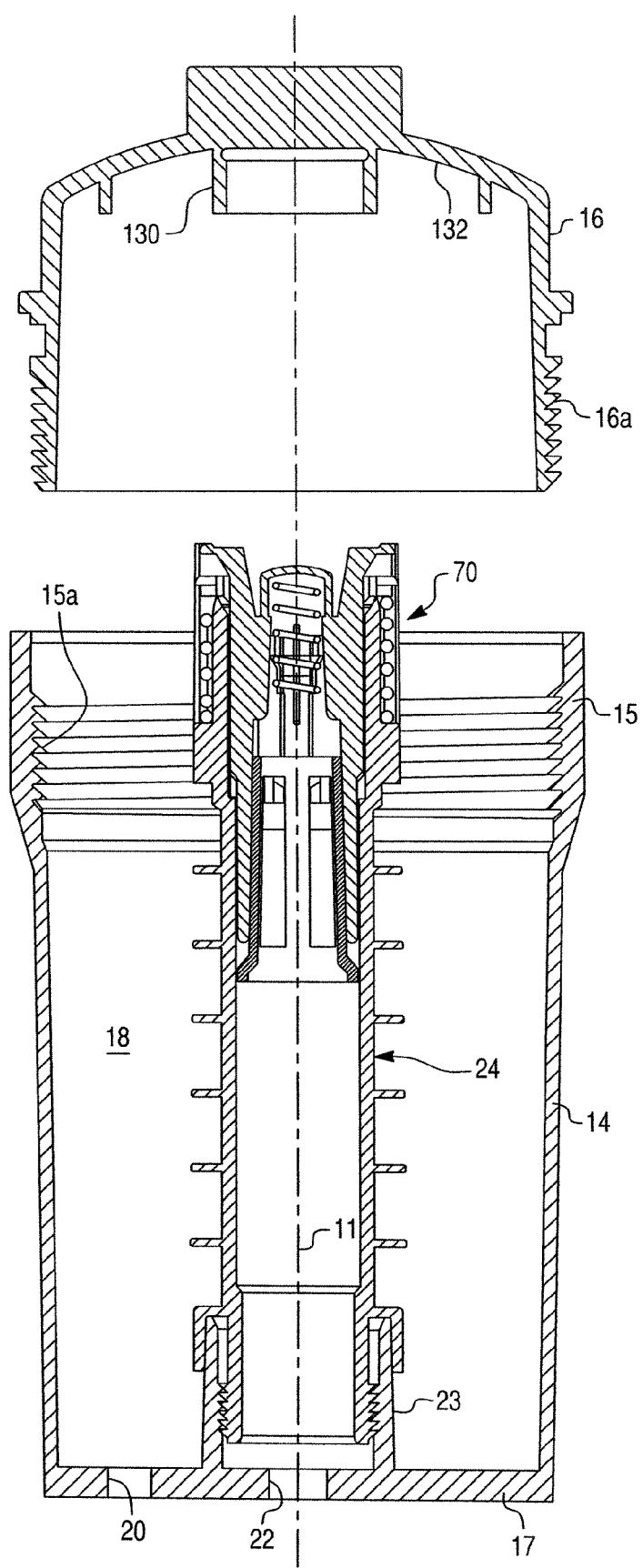
FIG. 2 is a cross-sectional view of a filter housing in accordance with the preferred embodiment of the present invention.

The filter housing 12, further illustrated in detail in FIG. 2, is rather conventional and includes a cup-shaped (or annular) housing body 14 having a central axis 11 and an opening at its top, and a housing lid 16 removably attached to the housing body 14. Preferably, the lid 16 is threadedly attached to the housing body 14. The housing body 14 and the lid 16 are formed from materials appropriate for the particular application, such as metal or hard plastic. The filter housing 12, i.e. the housing body 14 and the lid 16, defines a filter chamber (an interior cavity) 18 into which the removable filter element 40 is mounted.

The housing body 14 includes a disk-shaped end wall 17 provided with at least one fluid inlet port 20 and a fluid outlet port 22 which direct fluid into and out of the filter housing 12. The inlet and outlet ports 20 and 22, respectively, are illustrated as being formed in the end wall 17. However one or both could also be formed in the housing body 14, or even in the lid 16. In any case, fluid, such as fluid or oil, to be filtered is directed through the inlet port 20 and into the filter chamber 18 of the filter assembly 10, between the housing body 14 and the filter element 40. The fluid then passes radially inward through the filter element 40, where contaminants/particulate matters in the fluid are removed, and the filtered fluid then passes through the outlet port 22 to the downstream components of a fluid system. Thus, the filter housing 12 is adapted to be connected to a fluid system on the internal combustion engine (not shown) for receiving unfiltered fluid via the fluid inlet port 20 and returning filtered to the engine via the fluid outlet port 22.

The housing body 14 includes an open end 15, and a series of internal threads 15a are provided near the open end 15. The housing lid 16 also includes a series of external threads 16a provided near an open end thereof. The threads 15a of the housing body 14 cooperate with the threads 16a of the lid 16 to enable the lid 16 to be easily screwed onto and off of the housing body 14. An O-ring seal or gasket 21 is provided between the filter housing components, i.e. the housing body 14 and the lid 16, to provide a fluid-tight seal. The above is only one technique for attaching the lid 16 to the housing body 14, and other techniques are possible as should be known to those skilled in the art.

A threaded collar 23 is provided centrally in the end wall 17 of the housing body 14, and bounds the outlet port 22. The collar 23 projects axially upward a short distance from the end wall 17 toward the open end 15 of the housing body 14.

Referring now to FIGS. 1-4, a standpipe 24 extends vertically upward substantially coaxially to the central axis 11 of the filter housing 12. The standpipe 24 includes an internal flow passage 25, defined by an inner surface 29 of the standpipe 24, in fluid communication with the outlet port 22. The standpipe 24 also includes a threaded inner end 26 which is screwed into and sealingly received in the threaded collar 23. The inner end 26 of the standpipe 24 includes a short annular skirt 27 which is radially outwardly spaced from the standpipe 24, and is closely outwardly received around threaded collar 23. The standpipe 24 includes a series of ribs or flights as at 28 along its length. The flights 28 preferably extend in a continuous helix, and facilitate the movement of filtered fluid along the length of the standpipe 24, as well as provide uniform support along the inside surface of the filter element 40. The standpipe 24 preferably has one or more openings 30 (see FIG. 4) toward its distal (upper) end 32 to allow fluid to pass inward into the standpipe 24. The remainder of the length of the standpipe 24 can be imperforate, or may also have appropriate openings, depending upon the desired level of the fluid to be maintained in the standpipe 24. In certain situations, it is desired to maintain a certain level of fluid in the standpipe 24 for the smooth operation of the filter assembly 10 during start-up of the engine. Finally, the standpipe 24 includes an outer annular shoulder 34 and an inner annular step 35 (FIG. 6), both at appropriate locations along the length of the standpipe 24, and the reasons for which will be described below. The standpipe 24 is formed of material, e.g. metal, such as aluminum, or hard plastic, appropriate for the particular application.

The filter chamber 18 of the filter housing 12 is separated by the filter element 40 into a contaminated, or unfiltered, inlet chamber 18a and a clean, or filtered, exit chamber 18b. As shown in FIG. 1, the inlet chamber 18a is defined between an inner peripheral surface of the filter housing 12 and the filter element 40, while the exit chamber 18b is defined between the center tube 48 and the standpipe 24.

Figure 3:
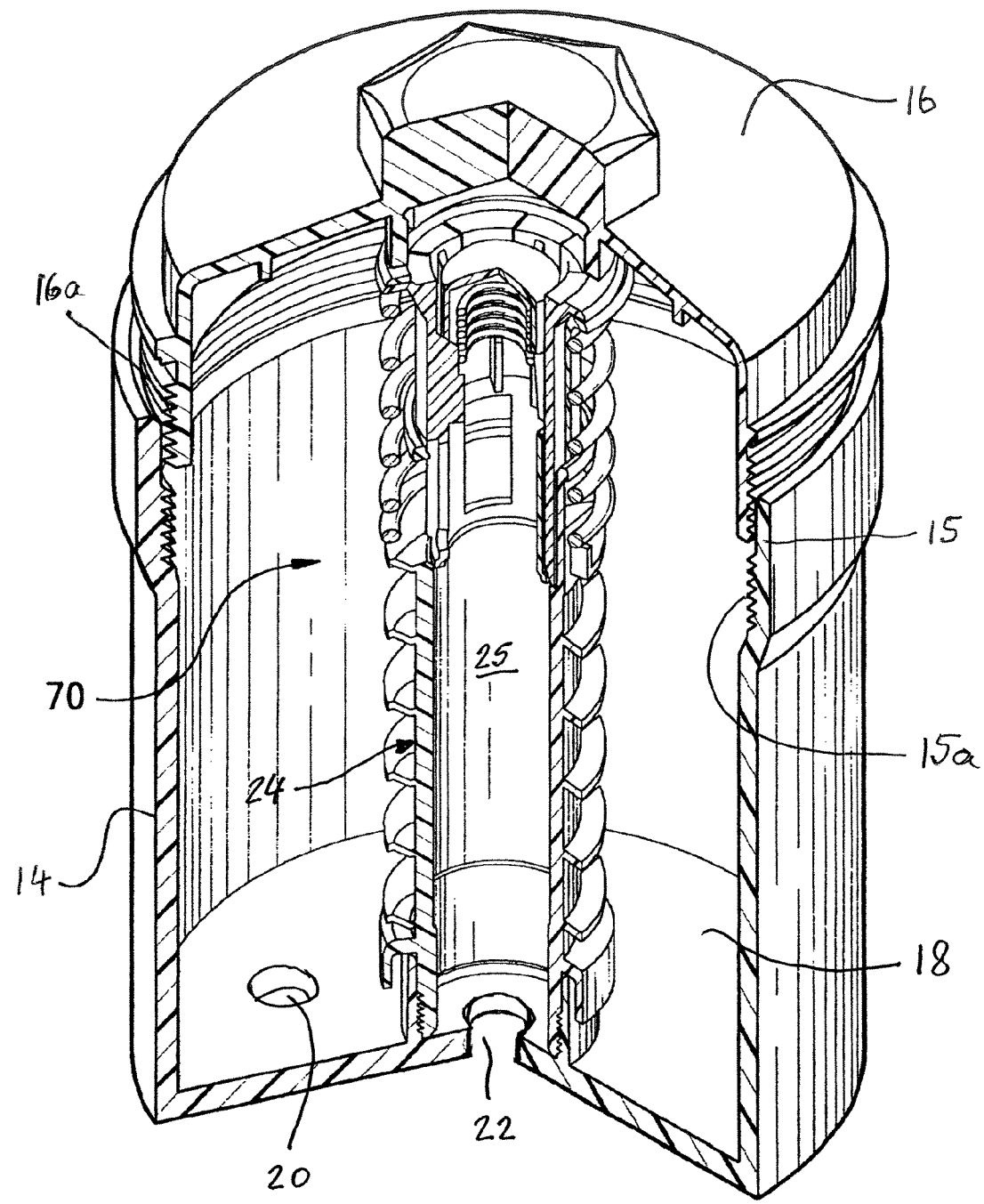
FIG. 3 is a partial perspective view of the filter housing in accordance with the preferred embodiment of the present invention.
Figure 4:
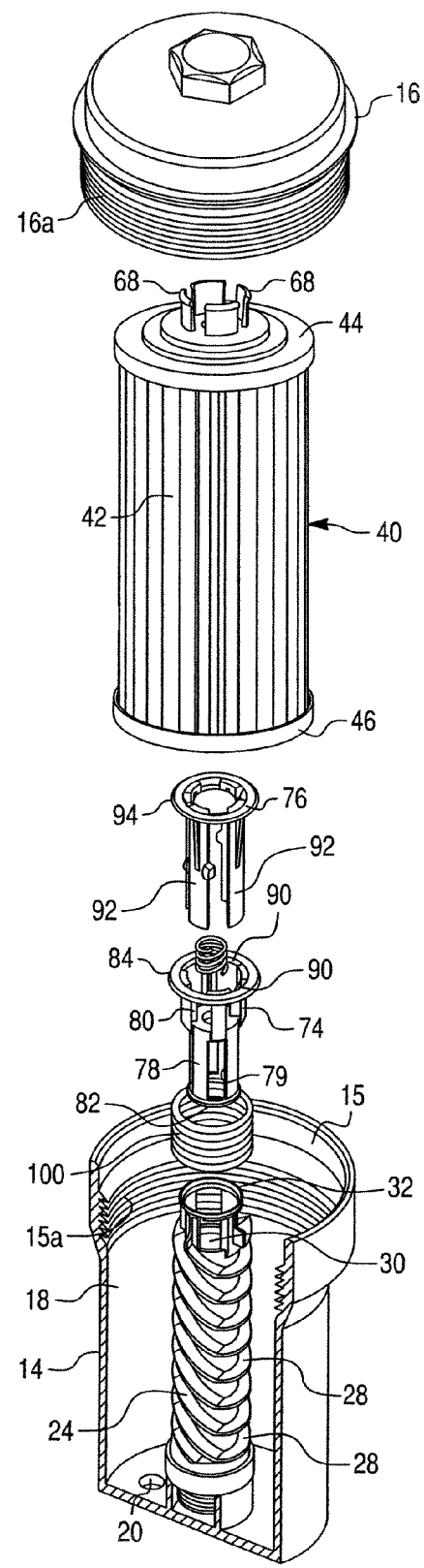
FIG. 4 is an exploded perspective view of the filter assembly in accordance with the preferred embodiment of the present invention.

A flow control valve assembly, indicated generally at 70 in FIGS. 2 and 3, is received in the standpipe 24. The flow control valve assembly 70 prevents the lid 16 from being attached to the housing body 14 unless a proper filter element 40 is installed in the housing body 14. To this end, the flow control valve assembly 70 includes a locking member 74 and a bypass member 76. The locking member 74 is closely and slidingly received in the bypass member 76, while the bypass member 76 is closely and slidingly received in the standpipe 24. As shown in FIG. 4, the locking member 74 includes a body 78 with a series of lower openings 79 for fluid flow, a series of upper openings 80, an annular base 82, and an enlarged annular head 84. The base 82 of the locking member 74 includes a radially-outward projecting annular flange 86 shown in FIG. 6. The bypass member 76 includes fingers 92 and an enlarged annular head 94. The body 78 of the locking member 74 includes a series of inner axial channels or slots 90, which are positioned to slidingly receive the fingers 92 of the bypass member 76. The locking member 74 is preferably formed unitarily (as a one-piece part) from any appropriate material, such as hard plastic.

Figures 5, 6:
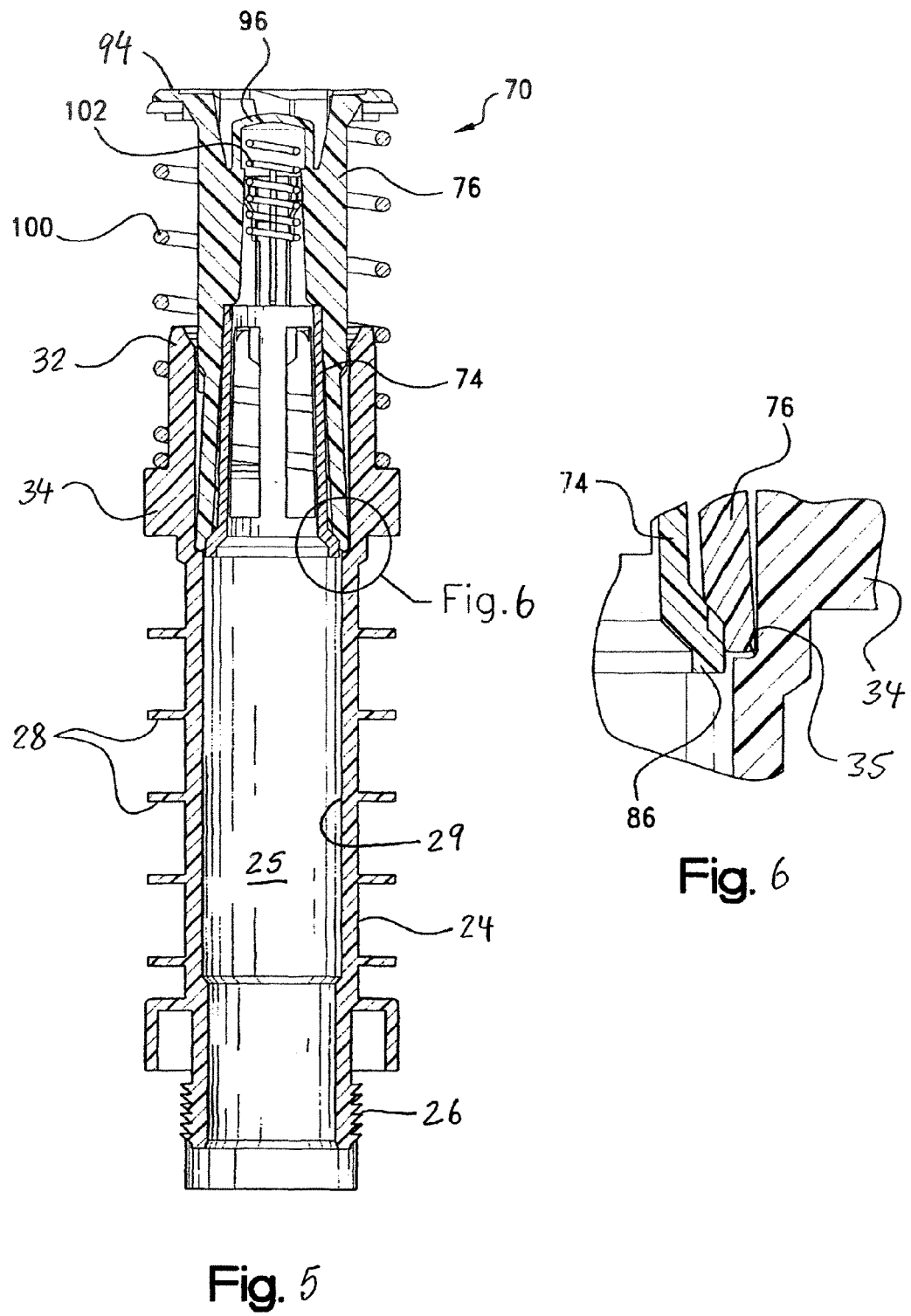
FIG. 5 is a cross-sectional side view of a standpipe of the filter housing of FIG. 2 illustrating an outer position of a flow control valve assembly.
FIG. 6 is an enlarged view of a portion of the standpipe of FIG. 5.

The enlarged annular head 94 of the bypass member 76 overlays the enlarged annular head 84 of the locking member 74 when the fingers 92 are received in the channels 90. The fingers 92 extend along the slots 90 in the locking member 74, and project outwardly (downwardly as shown in the accompanying Figures) through the upper openings 80. An imperforate dome-shaped end wall 96 is provided radially inwardly of the head 94, as shown in FIG. 5. The bypass member 76 is also preferably formed unitarily (as a one-piece part) from any appropriate material, such as hard plastic.

A main spring 100 is provided in surrounding relation to the distal (upper) end of the standpipe 24, the locking member 74 and the bypass member 76. The spring 100 extends between the annular shoulder 34 on the standpipe 24 and the enlarged head 84 of the locking member 74. The main spring 100 urges the head 84 of locking member 74 against the head 94 of bypass member 76, and hence urges these components axially outward from the standpipe 24. When the bypass member 76 is received in the locking member 74, the fingers 92 of the bypass member 76 project axially through the openings 80 in the locking member 74 and are received between the annular base 82 of the locking member 74 and the inside surface of the standpipe 24, as best seen in FIG. 5. The annular flange 86 of the base 82 urges the fingers 92 radially outward against the inner surface 29 of the standpipe 24, and creates an interference fit to retain the locking member 74 and the bypass member 76 in the standpipe 24, that is, to prevent the main spring 100 from pushing these components entirely outwardly from the standpipe 24. A bypass spring 102 is provided internally of the dome-shaped end wall 96 (as shown in FIG. 5), and biases the bypass member 76 outwardly away from the locking member 74. The bypass spring 102 extends between the dome-shaped end wall 96 and a radially inward directed annular spring stop 106 (illustrated in FIG. 1) on the locking member 74.

Figure 7:
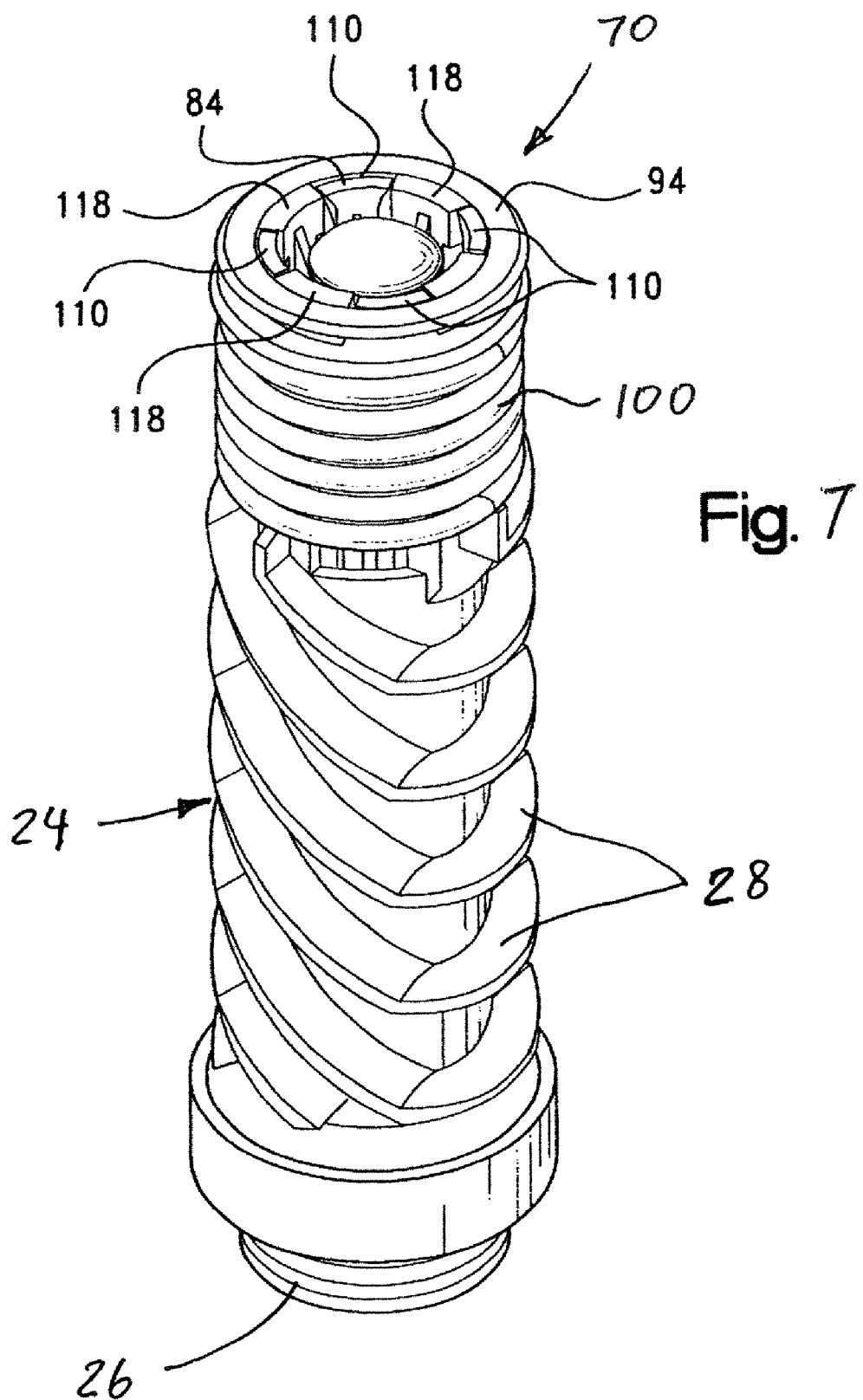
FIG. 7 is an elevated perspective view of the standpipe of the filter housing of FIG. 2.

As indicated above, the flow control valve assembly 70 prevents attachment of the lid 16 to the housing body 14 without a proper filter element installed in the housing 12. As illustrated in FIGS. 1 and 5, the main spring 100 normally urges the locking member 74 and bypass member 76 outwardly such that the distal inner ends of the fingers 92 of the bypass member 76 are axially outward of the annular step 35 (FIG. 6) in the standpipe 24. The annular base 82 of the locking member 74 urges the fingers 92 radially outward against the standpipe 24, such that the fingers 92 engage the step 35 and prevent the flow control valve assembly 70 from being pushed inwardly into the standpipe 24. As illustrated in FIG. 3, the flow control valve assembly 70 has an axial length sufficient that the lid 16 cannot be fully screwed onto the housing body 14 when the flow control valve assembly 70 is in its outer position. To disengage the bypass member 76 from the step 35 in the standpipe 24, the base 82 of the locking member 74 is moved axially away (inwardly) from the distal ends of the fingers 92 of the bypass member 76. As shown in FIG. 7, the head 94 of the bypass member 76 has a series of openings 110 that allow access to the underlying head 84 of the locking member 74.

The replaceable filter element 40 is removably mounted in the filter chamber 18 of the filter housing 12. The filter element 40 according to the preferred embodiment of the present invention illustrated in detail in FIGS. 8-12, includes a ring of a continuous, tubular filter media 42 in generally surrounding relation with the standpipe 24 so as to circumscribe the central axis 11. Preferably, the filter element 40 is mounted within the filter housing 12 substantially coaxially to the central axis 11. The filter media 42 may be one of several types of filter media material known in the art formed of an appropriate material in an appropriate manner and adapted for removing impurities from fluid that passes there through.

The filter element 40 further includes a first (upper) end cap 44 at its upper end, and a second (lower) end cap 46 at its lower end. The end caps 44 and 46 are engaging and supporting in fluid tight relation the filter media 42 at the opposite ends thereof in a conventional manner using potting compound or similar adhesive material. The filter element 40 further includes a center tube 48 having a substantially cylindrical side wall 49 extending vertically upward between the second end cap 46 and the first end cap 44.

As illustrated in FIG. 1, the center tube 48 is adapted to be disposed about the standpipe 24 substantially coaxially to the central axis 11 no that the cylindrical side wall 49 of the center tube 48 is radially spaced from the standpipe 24 to form the substantially cylindrical exit chamber 18b between the center tube 48 and the standpipe 24. Moreover, as illustrated in FIGS. 1 and 8-10, the cylindrical side wall 49 of the center tube 48 is perforated by at least one, preferably a number of holes 51 therethrough. Further preferably, the center tube 48 is homogenously formed of an appropriate material (such as plastic) unitarily with the second end cap 46 as a single piece unitary member in a conventional manner, such as by molding. Alternatively, the center tube 48 is integrally secured to the second end cap 46 by any appropriate manner known in the art, such as adhesive bonding, welding, etc.

Figure 10:
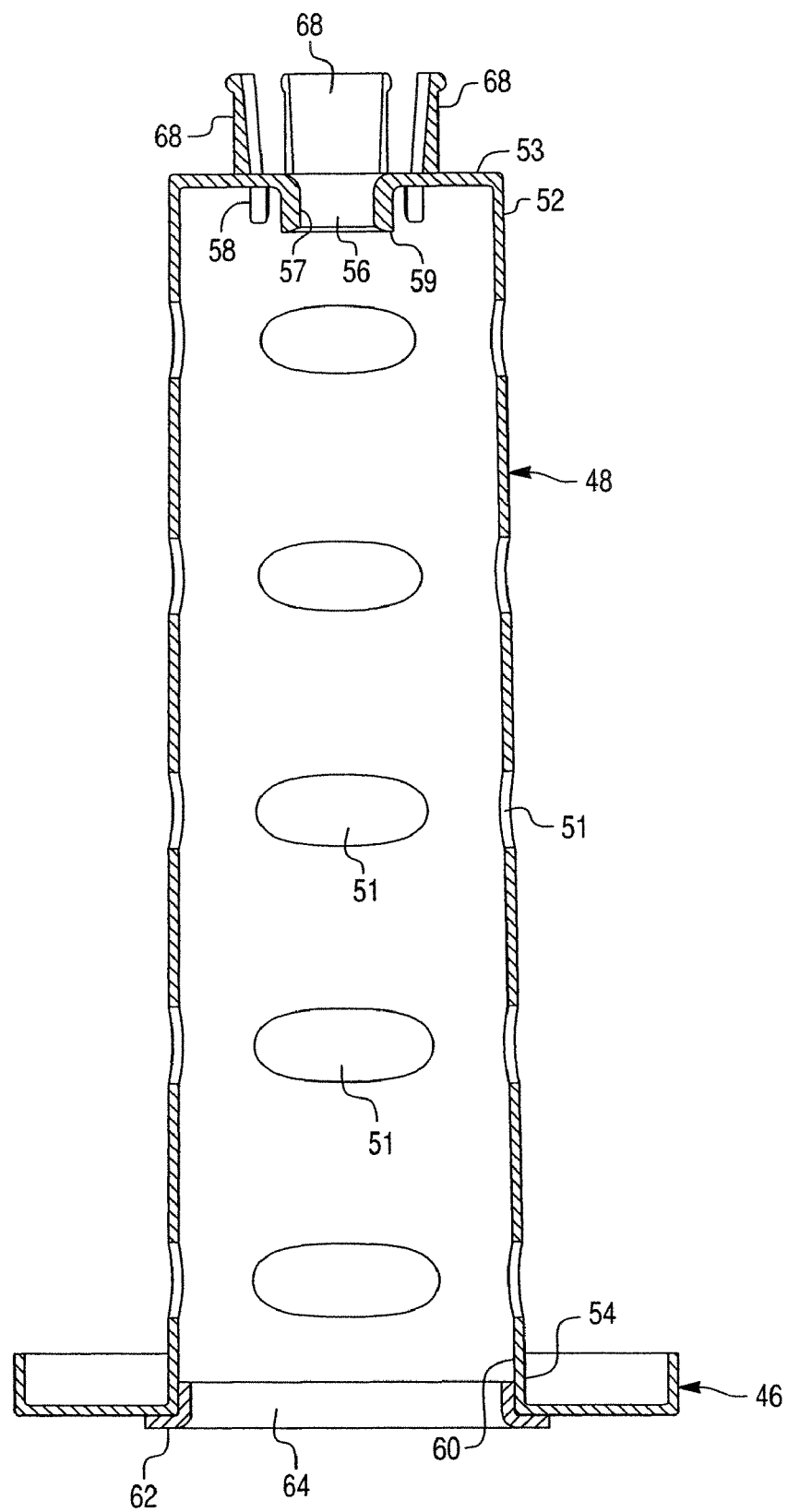
FIG. 10 is a cross-sectional side view of a center tube formed unitary with a second end cap of the filter element in accordance with the preferred embodiment of the present invention.
Figure 11:
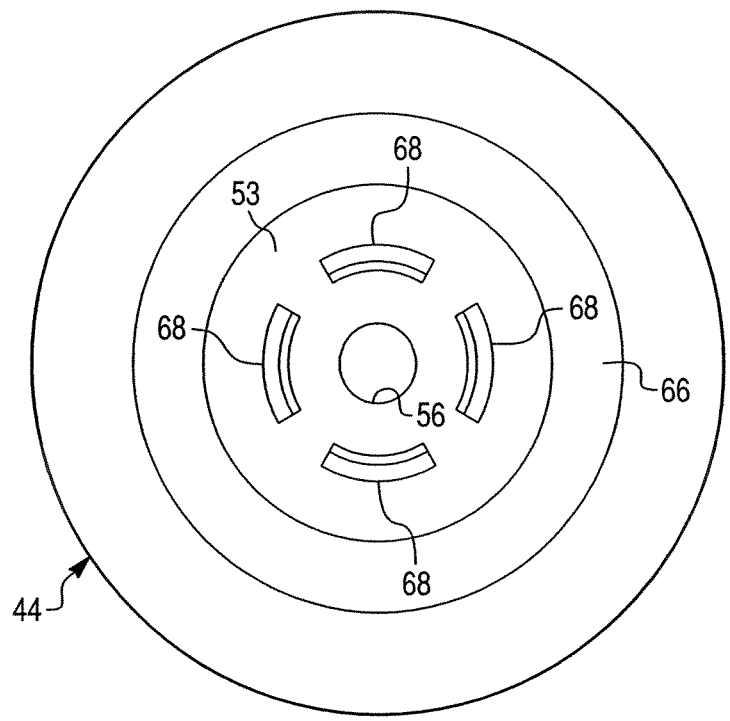
FIG. 11 is a top view of the center tube formed unitary with the second end cap of the filter element in accordance with the preferred embodiment of the present invention.
Figure 12:
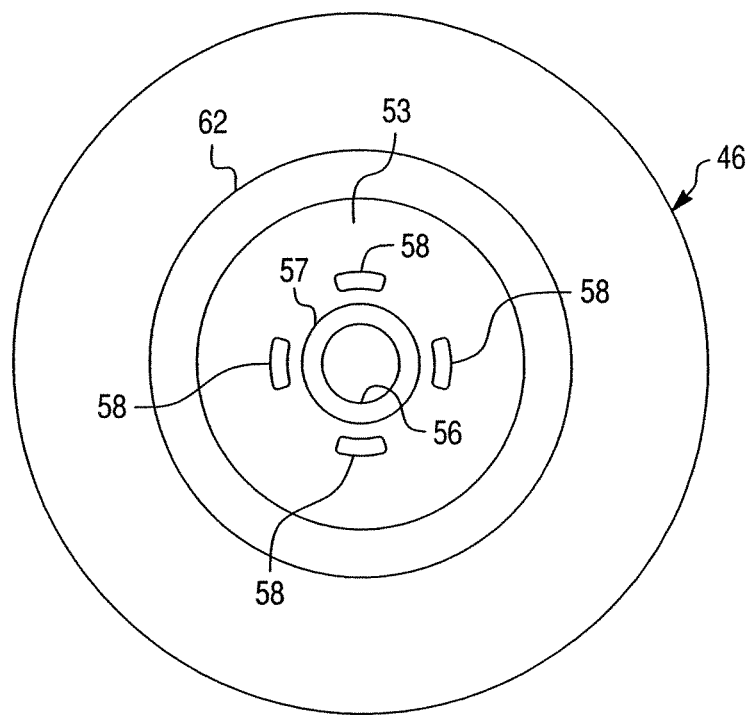
FIG. 12 is a bottom view of the center tube formed unitary with the second end cap of the filter element in accordance with the preferred embodiment of the present invention.

The center tube 48 has a first end 52 adjacent to the first end cap 44 and a second end 54 adjacent to the second end cap 46 of the filter element 40. The first end 52 of the center tube 48 has an end wall 53 substantially perpendicular to the central axis 11 and provided with a central bypass opening 56. As shown in FIGS. 10 and 12, an annular flange 57 bounds the bypass opening 56 in the end wall 53 of the first end 52, and projects a short distance axially inward into the center tube 48 toward the second end 54 thereof (but terminating at a point much closer to the first end 52 than the second end 54). Moreover, the end wall 53 of the first end 52 of the center tube 48 is provided with a series of distinct, axially-extending protrusions or actuator pins 58 corresponding to the location of the openings 110 in the bypass valve head 94. As illustrated, four such actuator pins 58 are shown in FIG. 14 in a generally evenly-spaced annular arrangement extending inwardly, away from the end wall 53 into the center tube 48. However, the number and spacing of the actuator pins 58 can vary depending upon the number and location of the openings 110, and it is noted that only a single protrusion may be necessary in some applications. Distal ends of the actuator pins 58, and/or lands 118 between the openings 110 (shown in FIG. 7), can have angled or helical ramped surfaces, to facilitate the orientation of the actuator pins 58 with the openings 110. The angled or helical surfaces force or urge the filter element 40 to rotate when the element is installed in the filter housing 12 such that the actuator pins 58 automatically become aligned with the openings 110. The actuator pins 58 are spaced radially inward from the end wall 53 into the center tube 48 and radially outward from the flange 57. The flange 57 includes a tapered distal end 59 which is dimensioned to engage flush against the dome-shaped end wall 96 of the bypass member 76 when the filter element 40 is located in the filter housing 12 (see, e.g., FIG. 1). The first end cap 44 and the second end cap 46 with the center tube 48 are preferably each formed of an appropriate material (such as plastic) unitarily (in one piece) in a conventional manner, such as by molding.

Figure 8:
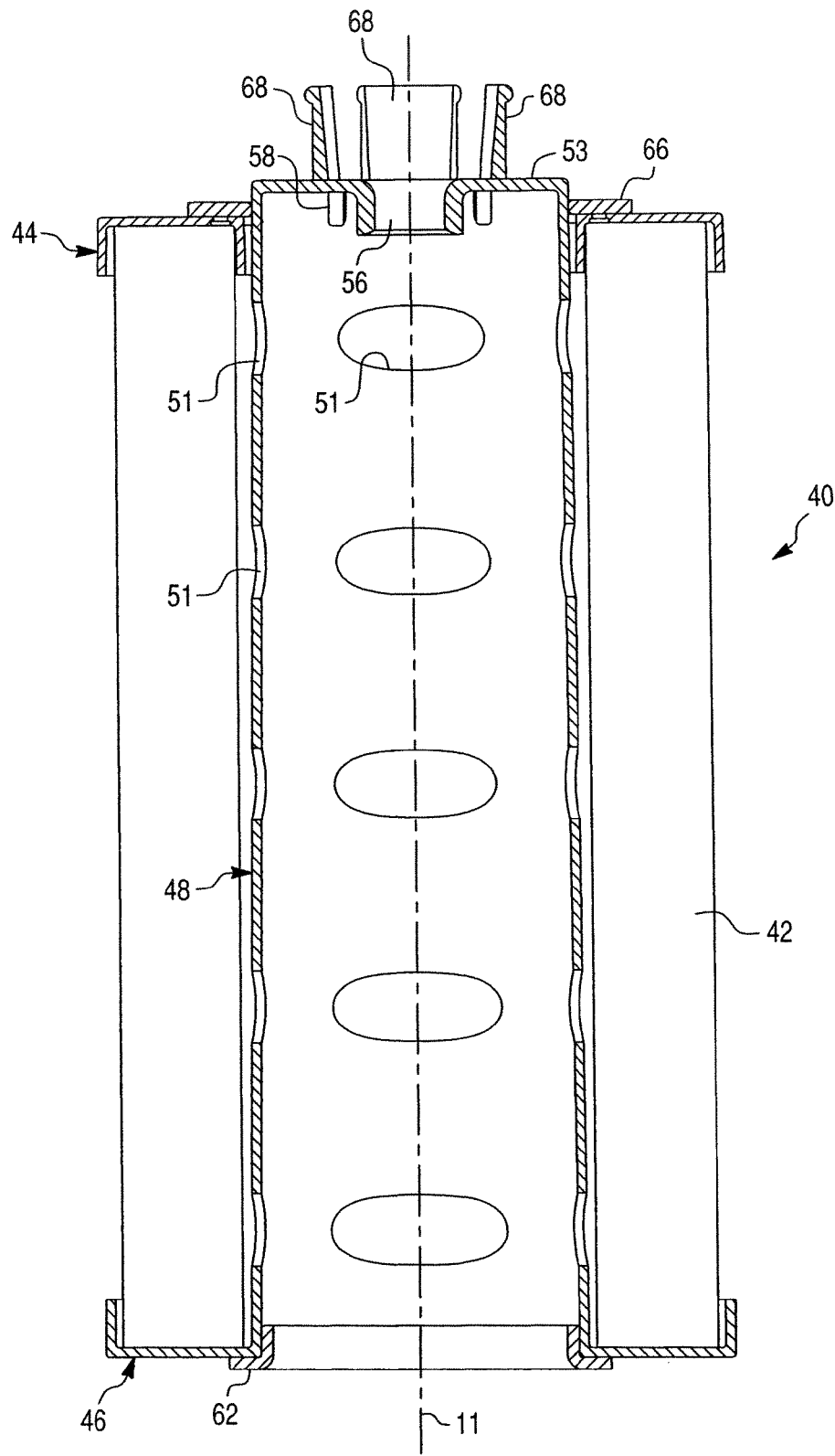
FIG. 8 is a cross-sectional side view of the filter element in accordance with the preferred embodiment of the present invention.
Figure 9:
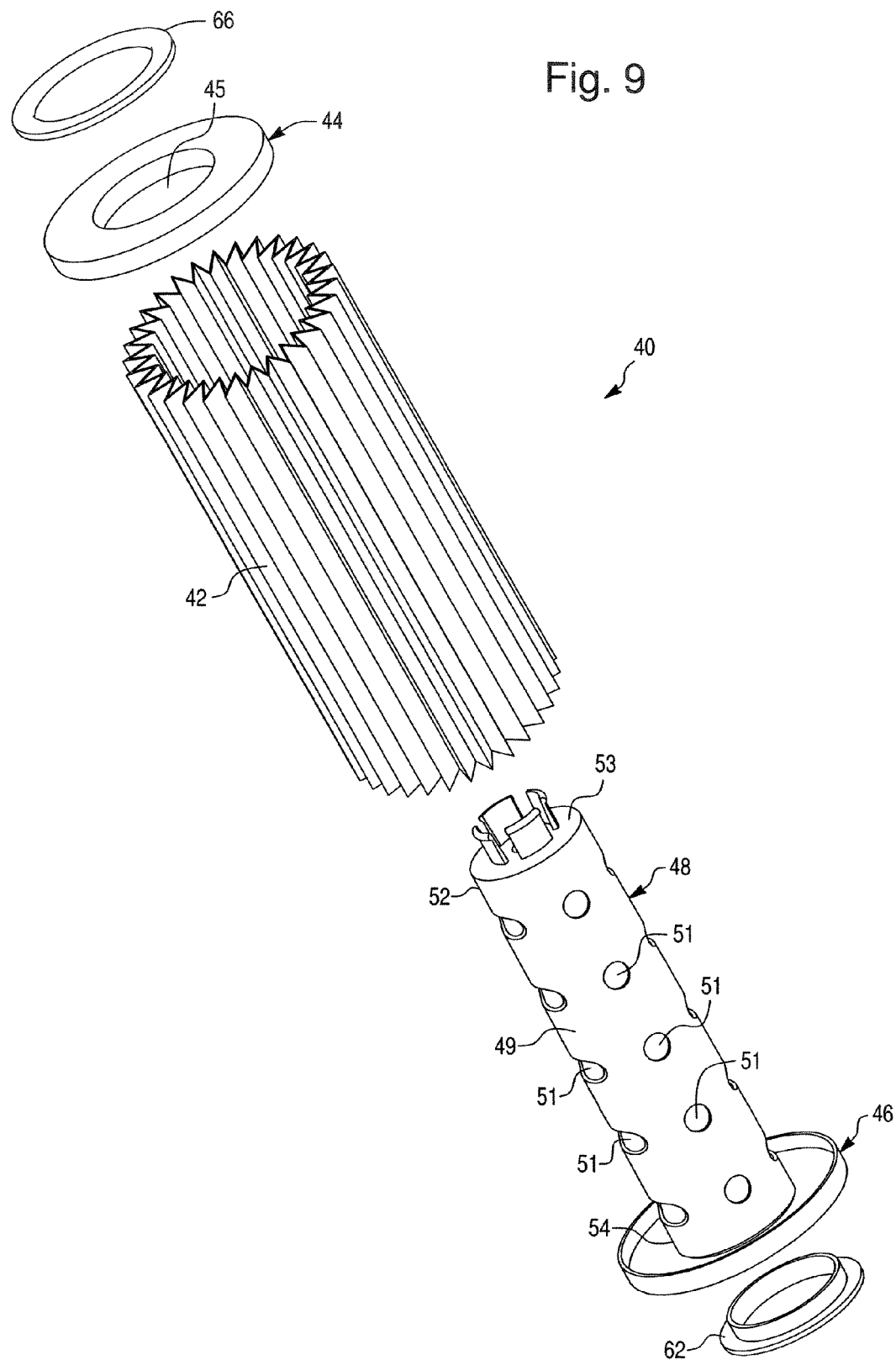
FIG. 9 is an exploded perspective view of the filter element in accordance with the preferred embodiment of the present invention.

When the filter element 40 is installed in the housing 12, the actuator pins 58 on the end wall 53 of the center tube 48 project through the openings 110 and engage the head 84 of the locking member 74. The actuator pins 58 force the locking member 74 axially inward into the standpipe 24, as shown in FIGS. 1 and 8. The base 82 of the locking member 74 moves axially away from inner ends of the fingers 92 of the bypass member 76, thereby allowing the fingers 92 to disengage from the step 35 and the bypass member 76 to slide inwardly into the standpipe 24. This allows the flow control valve assembly 70 to retract into the standpipe 24, compressing the main spring 100, and allows the lid 16 to be attached to the housing body 14. The length of the actuator pins 58 necessary to move the locking member 74 an appropriate axial distance can be easily determined.

It should be appreciated that the filter element 40 without a proper arrangement of actuator pins 58 will not engage the head 84 of the locking member 74, and the flow control valve assembly 70 will remain locked in its outer position. It will not be possible to attach the lid 16 to the housing body 14. Thus, the invention not only prevents the operation of the filter assembly 10 without a filter element 40 installed, but also prevents the operation of the filter assembly 10 even if the filter element 40 is installed, but where the filter element 40 fails to have a proper arrangement of actuator pins 58.

The first end cap 44 is provided with a central hole 45 adapted to receive the first end 52 of the center tube 48 therethrough. An annular, resilient seal, or grommet, 66 extends across the central hole 45 in the first end cap 44 to an outer peripheral surface of the center tube 48 to seal a volume inside the filter element 40 between the filter media 42 and the center tube 48 against infiltration of contaminated fluid. On the other hand, the end cap 46 includes a standpipe opening 60 dimensioned to receive the standpipe 24 and enable the filter element 40 to be removeably located over the standpipe 24. An annular, resilient seal, or grommet, 62 extends across the opening 60 to sealingly engage an outer peripheral surface of the standpipe 24.

Such an arrangement of the resilient seals 62 and 66 separates the filter chamber 18 of the filter housing 12 into the contaminated, or unfiltered, inlet chamber 18a and the clean, or filtered, exit chamber 18b. Thus, the resilient seals 62 and 66 are provided to seal the exit chamber 18b against infiltration of contaminated fluid, as illustrated in FIGS. 1 and 7. More specifically, as illustrated in FIG. 1, the resilient seal 62 sealingly engages an outer peripheral surface of the annular skirt 27 of the standpipe 24 so that all the perforations 51 are located within the exit chamber 18b in order to sealingly separate the exit chamber 18b from the inlet chamber 18a. The annular seal 62 defines a central opening 64 which accepts the standpipe 24 in the center tube 48. In turn, the resilient seal 66 sealingly engages an outer peripheral surface of the first end 52 of the center tube 48.

The end wall 53 into the center tube 48 is further provided with a series of distinct, axially-extending flexible fingers, tabs or other elements 68 corresponding to complementary to projections 130 formed on an interior cover top wall 132 of the lid 16 (see FIGS. 1 and 2). The fingers 68 are provided for engaging the cover top wall 132 of the lid 16 to retain the filter element 40 to the lid 16 during initial assembly and for pressing the filter element 40 against the biasing force of the main spring 100, as illustrated in FIG. 1. As illustrated, four such fingers 68 are shown in a generally evenly-spaced annular arrangement extending outwardly, away from the end wall 53 of the center tube 48, however the number and spacing of the fingers 68 can vary depending upon the particular structural arrangement of the filter assembly 10, and it is noted that only a single finger 68 may be necessary in some applications.

Preferably, the actuator pins 58 and the fingers 68 are homogenously formed from an appropriate material (such as plastic) unitarily with the center tube 48 as a single piece unitary member in a conventional manner, such as by molding.

In operation of the filter assembly 10, when the filter element 40 is installed properly in the filter housing 12, as illustrated in FIG. 1, the unfiltered (contaminated) fluid flows into the inlet chamber 18a of the filter housing 12 through the inlet port 20. The unfiltered fluid then flows into the inlet chamber 18a surrounding the filter element 40 and subsequently radially inward through the filter media 42 and the perforations 51 of the filter element 40 in the outside-in flow pattern into the exit chamber 18b and is cleansed of impurities. The clean fluid then travels from the exit chamber 18b into the standpipe 24. The filtered fluid leaves the filter housing 12 through the outlet port 22. If the filter element 40 becomes clogged, the bypass valve will allow fluid to bypass the filter element 40 when the fluid pressure in the inlet chamber 18a exceeds a predetermined amount.

A new filter element 40 is installed in the housing body 14 by placing the center tube 48 of the new filter element 40 about the standpipe 24. The filter element 40 is then moved downward. Movement of the filter element 40 into the filter chamber 18 causes the actuator pins 58 on the end wall 53 of the center tube 48 to align with the openings 110 so that the actuator pins 58 project through the openings 110 and engage the head 84 of the locking member 74. The actuator pins 58 then force the locking member 74 axially inward into the standpipe 24, as shown in FIGS. 1 and 8. The base 82 of the locking member 74 moves axially away from the inner ends of fingers 92 of the bypass member 76, thereby allowing the fingers 92 to disengage from the step 35 and the bypass member 76 to slide inwardly into the standpipe 24. This allows the flow control valve assembly 70 to retract into the standpipe 24, compressing the main spring 100, and allows the lid 16 to be attached to the housing body 14. Concurrently, the tapered distal end 59 of the flange 57 engages flush against the dome-shaped end wall 96 of the bypass member 76, thus closing the central opening 56. The lid 16 is then secured to the housing body 14 of the filter housing 12. In this position, the fingers 68 engage the projections 130 on the lid 16.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A filter assembly comprising:
  a housing lid removably-attached to a housing body that defines a filter chamber; a standpipe extending from an end wall of the housing body;
  a flow control valve affixed to the standpipe, wherein the flow control valve is defined to include a locking member including a head defining one or more openings; and
  a replaceable filter element disposable in said filter chamber, wherein said replaceable filter element includes a first end cap, a center tube integrally formed with the first end cap, wherein the center tube includes a substantially cylindrical side portion circumscribing an outer radial surface of the standpipe, an end wall that is formed integrally with said substantially cylindrical side portion, at least one flow control valve actuator pin extending axially from said end wall, wherein said at least one flow control valve actuator pin engages said head and projects through said one or more openings of said locking member of said flow control valve.

2. The filter assembly according to claim 1, wherein said end wall defines an axial bypass opening, wherein said substantially cylindrical side portion defines an inner axial fluid flow passage and a plurality of radial fluid passages, wherein said center tube further comprises a circumferential flange extending axially from said end wall within said inner axial fluid flow passage.

3. The filter assembly according to claim 1 wherein the replaceable filter element includes a second end cap and a filter media defining an axial passage, wherein the filter media is disposed between said first and second end caps, wherein the center tube is disposed in the axial passage of the filter media.

4. The filter assembly according to claim 1, wherein said at least one flow control valve actuator pin includes means for urging rotation of said replaceable filter element.

5. The filter assembly according to claim 4, wherein said means for urging rotation of said replaceable filter element includes a distal end of each of said at least one flow control valve actuator pin defining a helical ramped surface.

6. The filter assembly according to claim 4, wherein said means for urging rotation of said filter element includes lands disposed between said one or more openings of said head, wherein said lands define a helical ramped surface.

7. The filter assembly according to claim 1 further comprising:
a grommet having an inner radial surface and an outer radial surface, wherein the inner radial surface of the grommet is arranged adjacent the outer radial surface of the standpipe, wherein the outer radial surface of the grommet is arranged adjacent an inner radial surface of the substantially cylindrical side portion of the center tube.

8. The filter assembly according to claim 7, wherein the grommet is oriented to radially space the inner radial surface of the substantially cylindrical side portion of the center tube away from the outer radial surface of the standpipe.

9. A component of a filter element that engages a head and projects through one or more openings of a locking member of a flow control valve, comprising:
a center tube having a substantially cylindrical side portion, wherein the substantially cylindrical side portion defines an inner axial fluid flow passage, and a plurality of radial fluid passages in fluid communication with the inner axial fluid flow passage, and wherein the center tube includes an end wall formed integrally with said substantially cylindrical side portion, and further wherein said end wall defines an axial bypass opening;
a circumferential flange extending axially from said end wall within said inner axial fluid flow passage;
means for engaging said head and projecting axially through said one or more openings of said locking member of said flow control valve, wherein the means includes at least one pin extending axially away from said end wall and into said inner axial fluid flow passage; and
a plurality of flexible fingers axially extending from said end wall.

10. The component of a filter element according to claim 7, wherein said at least one pin is disposed between said substantially cylindrical side portion and said circumferential flange.

11. The component of a filter element as defined in claim 9, wherein said at least one pin includes a plurality of circumferentially-spaced pins axially extending into said inner axial fluid flow passage, wherein said at least one pin is radially spaced from said axial bypass opening.

12. The component of a filter element as defined in claim 9, wherein said circumferential flange defines said axial bypass opening.

13. The component of a filter element as defined in claim 9, wherein said at least one pin is a flow control valve actuator pin engages said head and projects through said one or more openings of said locking member of said flow control valve.

14. The component of a filter element as defined in claim 9 further comprising
a grommet having an inner radial surface and an outer radial surface, wherein the outer radial surface of the grommet is arranged adjacent an inner radial surface of the substantially cylindrical side portion of the center tube.

15. The component of a filter element as define in claim 14, wherein the inner radial surface of the grommet is arranged adjacent an outer radial surface of a standpipe including the flow control valve to provide means for radially spacing the inner radial surface of the substantially cylindrical side portion of the center tube away from the outer radial surface of the standpipe.

16. A filter element that engages a head and projects through one or more openings of a locking member of a flow control valve, comprising:
a tubular filter media having an axial passage, wherein the tubular filter media includes a first axial end and a second axial end;
a first end cap disposed adjacent the first axial end of the filter media;
an end cap assembly including a second end cap disposed adjacent the second axial end of said filter media, and a center tube disposed within said axial passage of the filter media, wherein the center tube is integrally connected with the second end cap, wherein the center tube includes an axial end wall, wherein the axial end wall defines an axial bypass opening, wherein the axial end wall includes means for axially engaging said head and axially projecting through said one or more openings of said locking member of said flow control valve; and
a grommet having an inner radial surface and an outer radial surface, wherein the outer radial surface of the grommet is arranged adjacent an inner radial surface of the center tube.

17. The filter element according to claim 16, wherein the means extends axially away from said end wall and axially into an axial passage of said center tube.

18. The filter element according to claim 17, wherein the means includes at least one pin projecting axially into the axial passage of said center tube.

19. The filter element according to claim 18, wherein said at least one pin includes means for urging rotation of said filter element.

20. The filter element according to claim 19, wherein said means for urging rotation of said filter element includes a distal end of each of said at least one pin defining a helical ramped surface.

21. The filter element according to claim 19, wherein said means for urging rotation of said filter element includes lands disposed between said one or more openings of said head, wherein said lands define a helical ramped surface.

22. The filter element according to claim 18, wherein said axial end wall further comprises a bypass opening, wherein said at least one pin includes a series of distinct pins extending axially into said axial passage of said center tube and spaced radially outward from said bypass opening.

23. The filter element according to claim 18, wherein said series of distinct pins are circumferentially spaced from each other.

24. The filter element according to claim 16, wherein the inner radial surface of the grommet is arranged adjacent an outer radial surface of a standpipe including the flow control valve to provide means for radially spacing the inner radial surface of the center tube away from the outer radial surface of the standpipe.

* * * * *